(12) United States Patent
Reinpold (10) Patent No.: US 9,656,758 B2
(45) Date of Patent: May 23, 2017

(54) EMERGENCY PARACHUTE

(71) Applicant: Philip C. Reinpold, Pueblo West, CO (US)

(72) Inventor: Philip C. Reinpold, Pueblo West, CO (US)

( * ) Notice: Subject to any disclaimer, the term of this patent is extended or adjusted under 35 U.S.C. 154(b) by 397 days.

(21) Appl. No.: 14/483,430

(22) Filed: Sep. 11, 2014

(65) Prior Publication Data

US 2015/0102171 A1   Apr. 16, 2015

Related U.S. Application Data

(60) Provisional application No. 61/889,298, filed on Oct. 10, 2013.

(51) Int. Cl.
| | | |
|---|---|---|
| *B64D 17/00* | (2006.01) | |
| *B64D 17/72* | (2006.01) | |
| *B64D 17/40* | (2006.01) | |
| *B64D 17/30* | (2006.01) | |

(52) U.S. Cl.
CPC .......... *B64D 17/725* (2013.01); *B64D 17/30* (2013.01); *B64D 17/40* (2013.01); *Y02B 10/30* (2013.01)

(58) Field of Classification Search
CPC ...... B64D 17/30; B64D 17/40; B64D 17/725; B64D 17/72; B64D 17/025; B64D 17/00; B64D 25/06; B64D 17/32; B64D 17/52; B64D 17/62; B64D 17/64; B64D 25/08; B64D 2700/62543
See application file for complete search history.

(56) References Cited

U.S. PATENT DOCUMENTS

| | | | | | |
|---|---|---|---|---|---|
| 2,318,673 | A | * | 5/1943 | Coleman ................ | B64D 17/30 244/148 |
| 2,393,311 | A | * | 1/1946 | Cunningham ......... | B64D 17/30 244/151 A |
| 2,402,264 | A | * | 6/1946 | Smith .................... | B64D 17/30 244/151 A |
| 2,834,083 | A | * | 5/1958 | Newell .................. | B64D 17/38 24/323 |
| 2,924,409 | A | * | 2/1960 | Burke, Jr. ............. | B64D 17/54 244/149 |
| 2,950,885 | A | * | 8/1960 | Hatfield ................ | B64D 17/52 244/141 |
| 3,193,223 | A | * | 7/1965 | Davis .................... | B64D 17/34 244/149 |

(Continued)

*Primary Examiner* — Brian M O'Hara
*Assistant Examiner* — Assres H Woldemaryam (57) ABSTRACT

An emergency parachute is a device for allowing the user to eject from a perilous high-altitude structure and float to safety once clear of the structure. The emergency parachute features a vest that may be donned by the user. The user is required to face toward the structure that he or she is escaping. In order to activate the canopy of the emergency parachute, the user is required to engage a first activation handle and a second activation handle of a simultaneous activation dual switch. The simultaneous activation dual switch ensures that the canopy is not accidentally deployed. A chute-inflation gas generator inflates the canopy and simultaneously ejects the user backward. The ejection serves the twofold purpose of ensuring that the user is able to clear the structure that he or she is escaping as well as aiding the user in overcoming any fears of jumping from a high altitude.

18 Claims, 7 Drawing Sheets

(56) References Cited

U.S. PATENT DOCUMENTS

| | | | | |
|---|---|---|---|---|
| 3,262,660 A * | 7/1966 | Morrell | ............... | B64D 17/30 244/148 |
| 3,737,126 A * | 6/1973 | Martin | ............... | B64D 25/10 24/313 |
| 3,757,371 A * | 9/1973 | Martin | ............... | B64D 17/30 222/5 |
| 3,921,944 A * | 11/1975 | Morrison | ............... | A62B 1/22 2/456 |
| 4,440,366 A * | 4/1984 | Keeler | ............... | B64D 17/00 244/138 R |
| 5,388,786 A * | 2/1995 | Hirose | ............... | B64D 17/72 182/3 |
| 5,409,187 A * | 4/1995 | Dunham | ............... | B63C 9/26 102/340 |
| 5,544,846 A * | 8/1996 | Stroud | ............... | B64D 17/40 244/147 |
| 6,427,252 B1 * | 8/2002 | Lewis | ............... | A41D 13/0007 182/3 |
| 6,644,597 B1 * | 11/2003 | Bahniuk | ............... | B64D 17/38 244/142 |
| 6,705,572 B1 * | 3/2004 | Christopher | ............... | B64D 17/72 244/142 |
| 8,091,151 B2 * | 1/2012 | Johnson | ............... | A62B 35/0018 2/102 |
| 8,240,610 B1 * | 8/2012 | Cooper | ............... | A41D 13/0155 2/2.14 |
| 8,684,891 B1 * | 4/2014 | Davidson | ............... | B64D 17/30 244/142 |
| 2003/0136880 A1 * | 7/2003 | LaSee | ............... | B64D 17/40 244/148 |
| 2008/0173764 A1 * | 7/2008 | Oh | ............... | B64D 17/72 244/143 |
| 2008/0272238 A1 * | 11/2008 | Fradet | ............... | B64D 17/30 244/148 |
| 2011/0168846 A1 * | 7/2011 | Strong | ............... | B64D 17/30 244/148 |
| 2013/0092796 A1 * | 4/2013 | Weinel | ............... | A45C 13/021 244/149 |
| 2013/0190144 A1 * | 7/2013 | Ross | ............... | A63B 21/0603 482/105 |
| 2013/0221159 A1 * | 8/2013 | Giannakopoulos | ............... | B64C 13/30 244/139 |

* cited by examiner

EMERGENCY PARACHUTE

The current application claims a priority to the U.S. Provisional Patent application Ser. No. 61/889,298 filed on Oct. 10, 2013.

FIELD OF THE INVENTION

The present invention relates generally to an emergency parachute. More specifically, the present invention is an emergency parachute for aiding a user in escaping a perilous high-altitude situation such as, but not limited to, a high-rise building.

BACKGROUND OF THE INVENTION

The evolution of modern infrastructure has led to the growth of structures such as skyscrapers to larger sizes than ever before. While these structures are awe-inspiring in their grandeur, the sheer size of the structures creates perils for those working within and outside of the structures. The perils of modern infrastructure were aptly demonstrated during the September 11 attacks on the North Tower and South Tower of the World Trade Center. Following the impacts of the hijacked airliners, many people became trapped on the upper levels of the towers with no means of escape as the towers neared collapse. Once it became clear that escape was not possible, many of those trapped in the towers chose not to face death in the burning and collapsing buildings and leapt to their deaths in a horrifying spectacle that was broadcast on live television. While the September 11 attacks are a particularly unnatural and grotesque example of high-altitude perils faced by those working in such locations, the attacks highlighted the potential perils that office workers, bridge workers, window washers, construction workers, and others face. While some of these personnel utilize specialized gear and equipment specifically designed to ensure safety, no system is failsafe and it is still quite possible for an unexpected failure to occur. Gear and equipment failures often happen very quickly and with no warning, leaving little to no time to react. The continuing evolution of modern architecture and infrastructure is accompanied by the increasing likelihood of emergencies occurring in high-altitude locations.

The present invention is an emergency parachute that is designed to aid the user in escaping from a perilous high-altitude situation. The emergency parachute is worn in a similar manner as an airline safety vest and may be quickly donned by the user if needed. The emergency parachute features a parachute that may be deployed by the user. Prior to deployment, the user is required to face toward the structure that he or she is escaping such as the interior of a building. Upon deployment, the parachute is rapidly inflated and the user is forcibly ejected backward. This mechanism serves the twofold purpose of propelling the user clear of the structure and assisting the user in overcoming any fears of jumping from a high altitude. The emergency parachute may be used for escaping various high-altitude structures and locations including, but not limited to, high-rise buildings, wind turbines, and mountainous regions. In various applications, the emergency parachute may be utilized in conjunction with an egress station such as a platform, rail, or similar device. The use of such an egress station facilitates usage of the emergency parachute and aids users who may be unfamiliar with the functionality of the emergency parachute.

DETAIL DESCRIPTIONS OF THE INVENTION

All illustrations of the drawings are for the purpose of describing selected versions of the present invention and are not intended to limit the scope of the present invention.

The present invention is an emergency parachute for use in escaping a perilous high-altitude situation. The present invention comprises a vest 1, a chute quick-release harness 5, a parachute assembly 12, a chute-inflation gas generator 15, and a simultaneous activation dual switch 20. The vest 1 may be quickly donned by the user in a time of need while the chute quick-release harness 5 serves to connect the vest 1 to the parachute assembly 12. The chute quick-release harness 5 additionally allows the user to release the parachute assembly 12 upon landing safely. The chute-inflation gas generator 15 rapidly engages the parachute assembly 12 and additionally serves to eject the user backward, aiding the user in overcoming any fears of jumping from a high-altitude location. The simultaneous activation dual switch 20 ensures that the parachute assembly 12 is not accidentally engaged.

Figure 1:
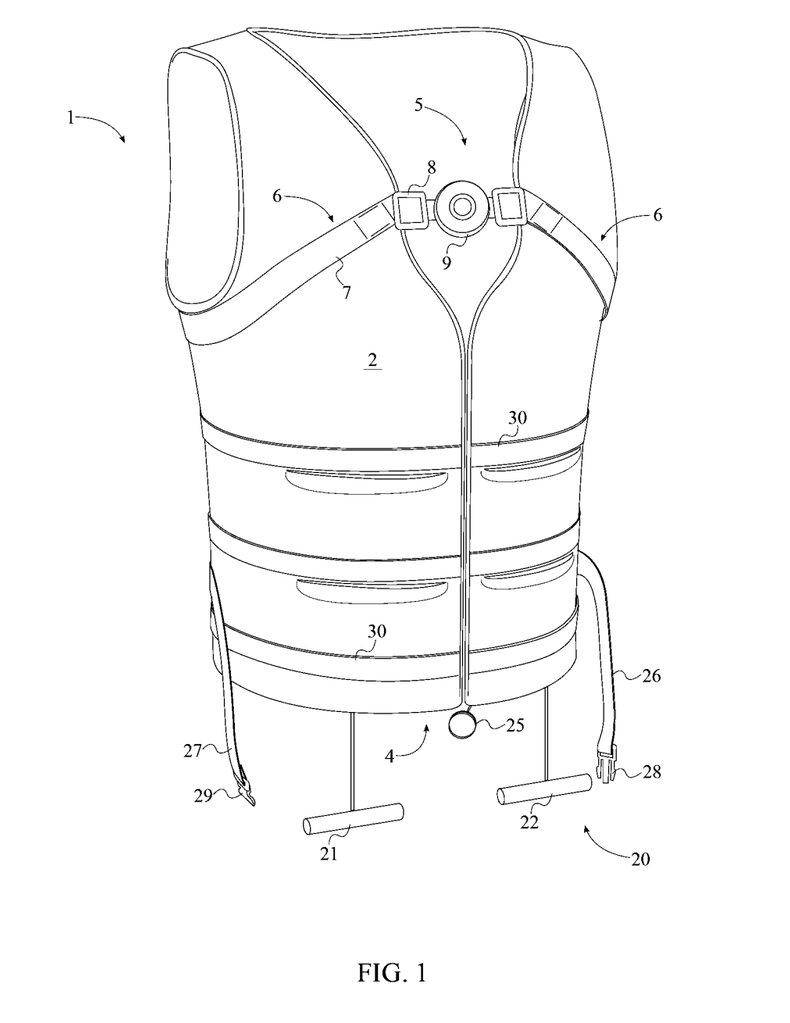
FIG. 1 is a perspective view of the present invention.
Figure 2:
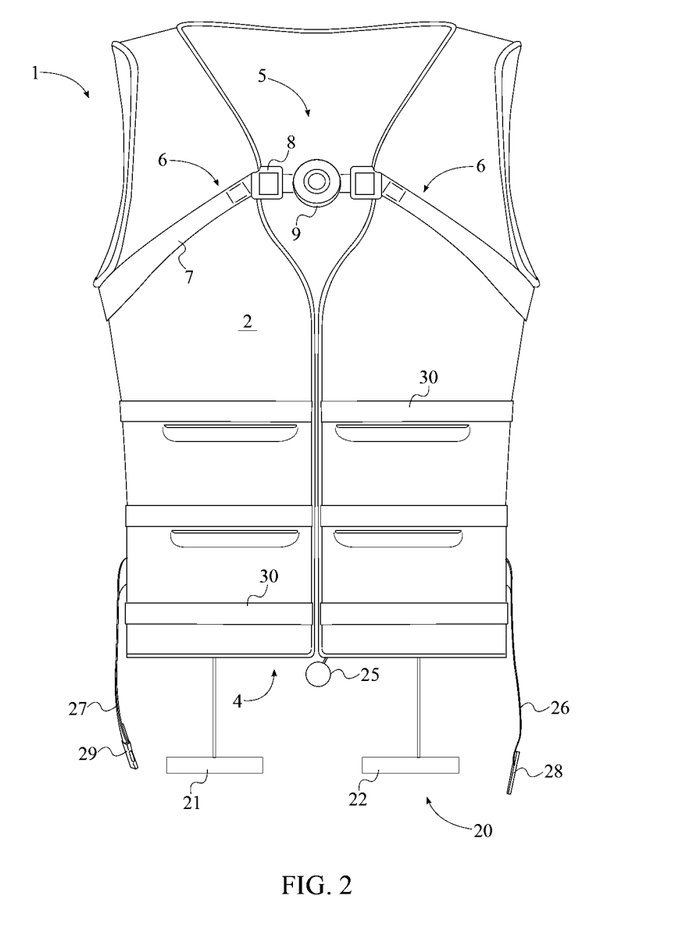
FIG. 2 is a front view of the present invention.
Figure 3:
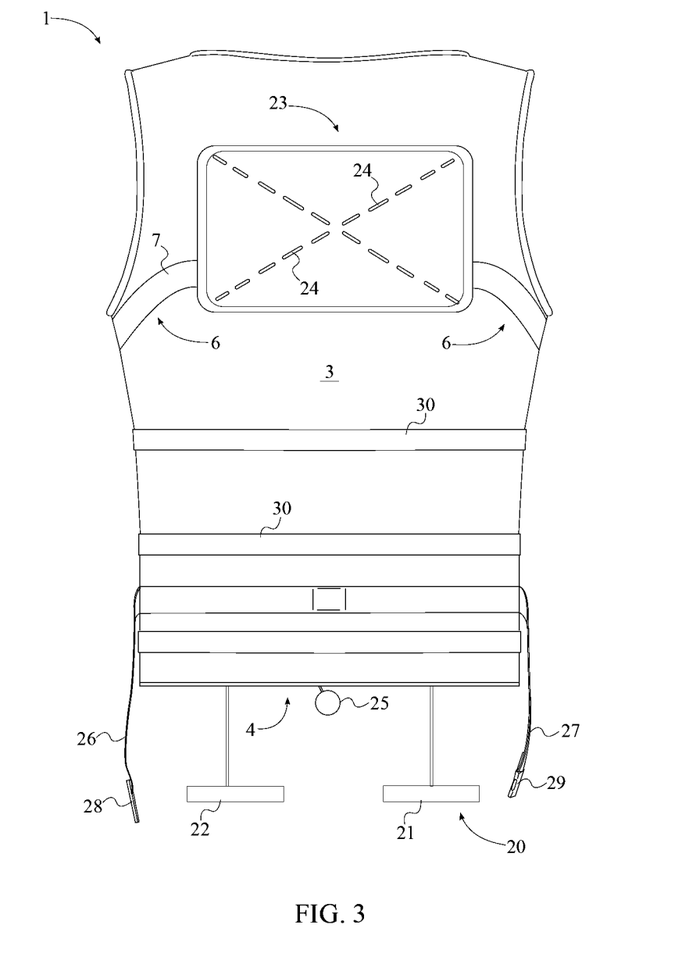
FIG. 3 is a rear view of the present invention.

Referring to FIGS. 1-3, the vest 1 comprises a front section 2 and a back section 3 that correspond to the front side and back side of the user's torso, respectively. The vest 1 may be donned by the user in the same manner as the article of clothing of the same name. The parachute assembly 12 comprises a canopy 13 that, when deployed, slows the movement of the user during free fall through the creation of drag. The parachute assembly 12 is mounted onto the back section 3 in a manner such that the canopy 13 may be deployed behind the user. The canopy 13 is composed of a material that is lightweight, sturdy, and packable. The chute-inflation gas generator 15 is utilized to rapidly inflate the canopy 13. The chute-inflation gas generator 15 comprises a containment housing 16, an output nozzle 17, and an igniter 18. The containment housing 16 is integrated in between the parachute assembly 12 and the back section 3 in order to allow the chute-inflation gas generator 15 to inflate the canopy 13. The output nozzle 17 is in fluid communication with the containment housing 16. Additionally, the canopy 13 is situated adjacent to the output nozzle 17.

Figure 4:
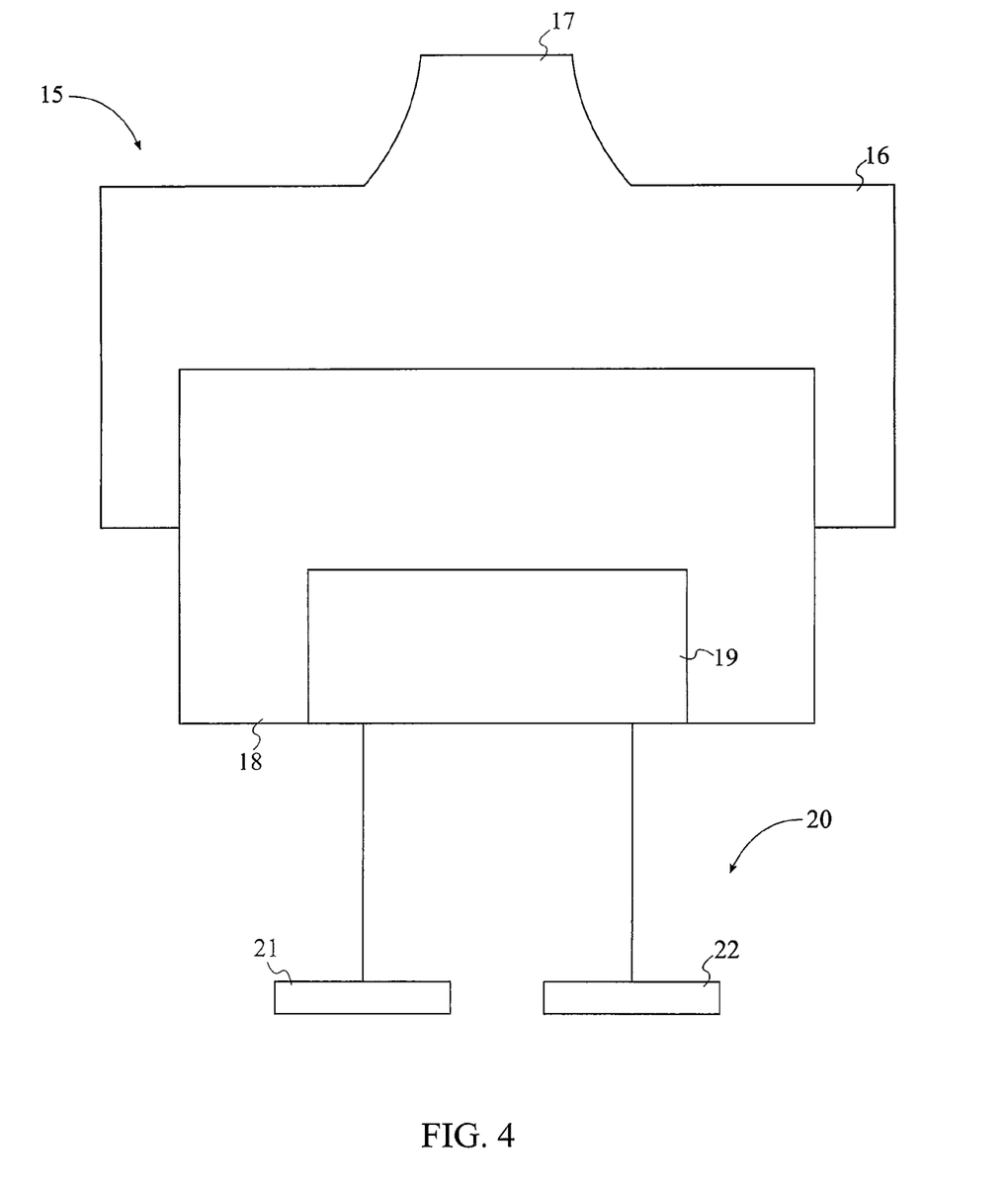
FIG. 4 is a schematic diagram of the chute-inflation gas generator and the simultaneous activation dual switch.
Figure 5:
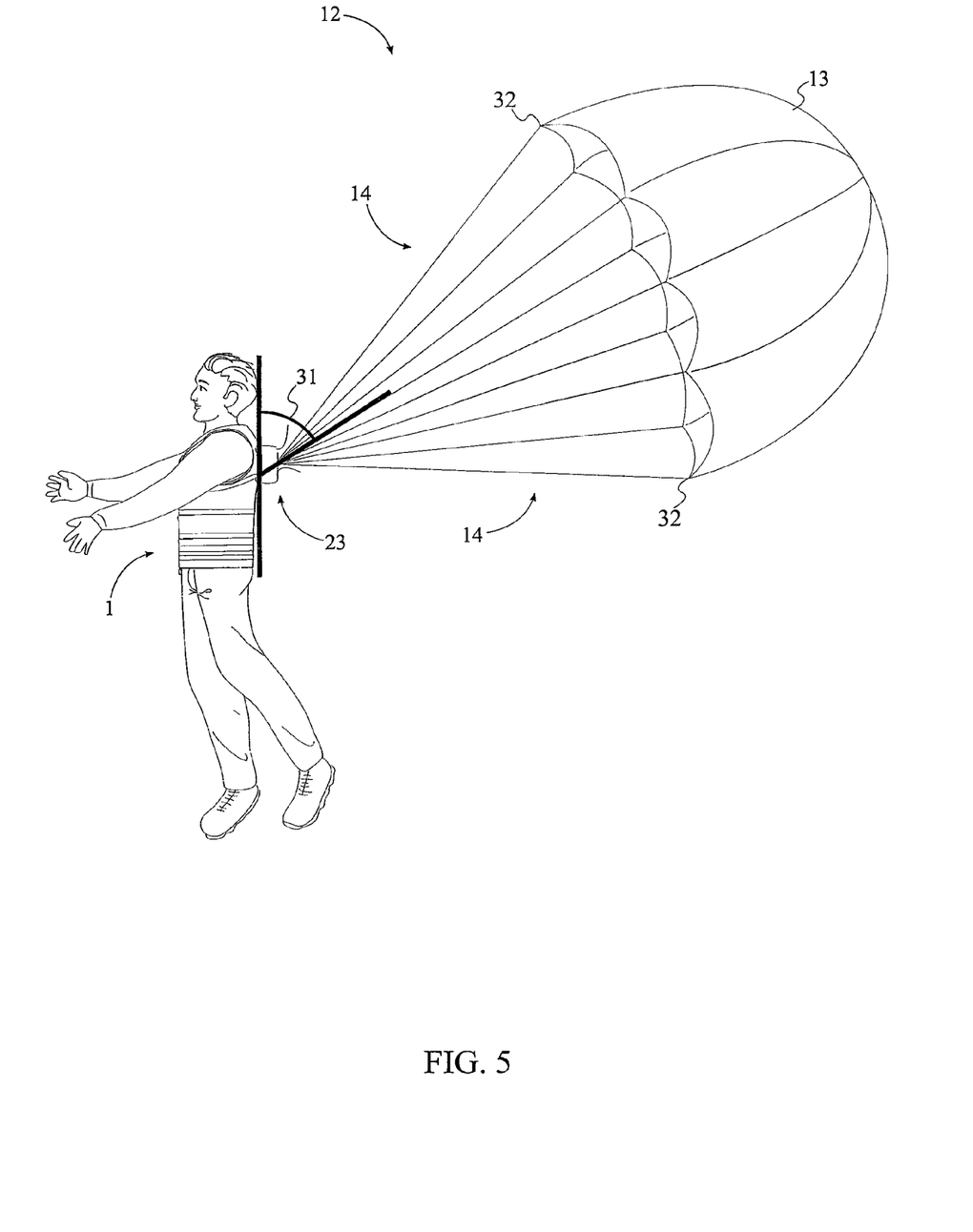
FIG. 5 is a side view of the present invention during deployment of the canopy.

With reference to FIG. 4, the simultaneous activation dual switch 20 is operatively coupled to the igniter 18 allowing the simultaneous activation dual switch 20 to be utilized to actuate the igniter 18 and initiate the canopy 13 inflation process. The simultaneous activation dual switch 20 is positioned on the front section 2 in order to provide easy access to the user. In the preferred embodiment of the present invention, the containment housing 16 holds a propellant. The igniter 18 is integrated into the containment housing 16. Upon actuation of the simultaneous activation dual switch 20, the igniter 18 ignites the propellant, causing the propellant to burn extremely rapidly. The burning of the propellant creates a large volume of gas that is able to exit the containment housing 16 through the output nozzle 17 as the output nozzle 17 is in fluid communication with the containment housing 16. The large volume of gas exiting the output nozzle 17 adjacent to the canopy 13 causes the canopy 13 to rapidly inflate as shown in FIG. 5. The output nozzle 17 is oriented at a parachute ejection angle 31 and is oriented away from the back section 3. As such, the user is required to face toward the structure that he or she is escaping prior to deploying the canopy 13. The parachute ejection angle 31 causes the user to be forcibly ejected at an angle from the structure that he or she is escaping and serves the twofold purpose of ensuring that the user is able to clear the structure and aiding the user in overcoming any fears of jumping from a high altitude. The canopy 13 inflation process may vary across multiple embodiments of the present invention to include a range of alternative mechanisms for inflation.

Figure 6:
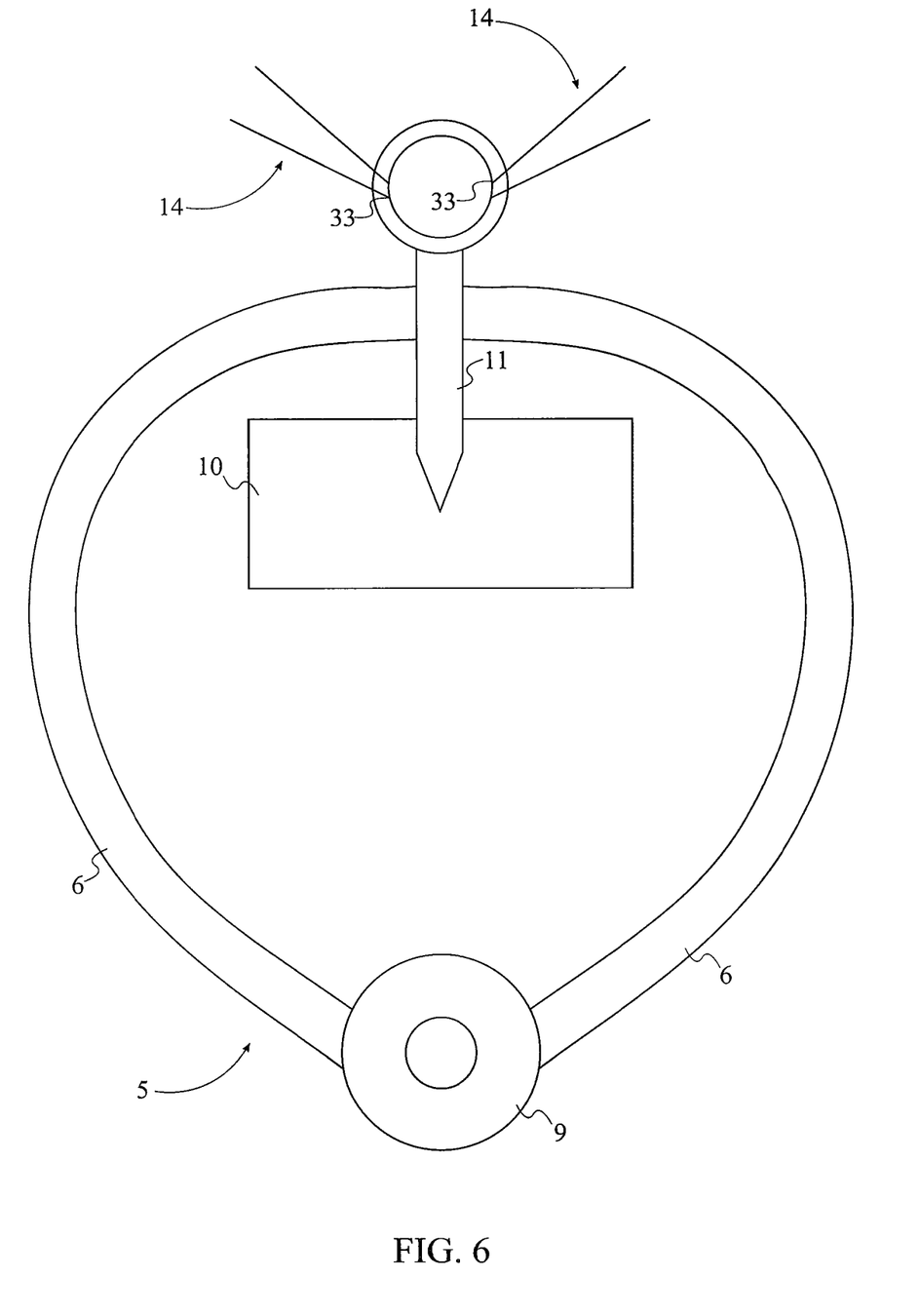
FIG. 6 is a schematic diagram of the chute quick-release harness mechanism for releasing the line pin from the anchor.

The chute quick-release harness 5 comprises a plurality of chest straps 6, a quick-release switch 9, a line pin 11, and an anchor 10. The plurality of chest straps 6 is positioned about the vest 1 with each of the plurality of chest straps 6 connected from the quick-release switch 9 to the line pin 11. The anchor 10 is mounted onto the back section 3 and the line pin 11 is pivotally and detachably mounted into the anchor 10. The plurality of chest straps 6 secures the line pin 11 in place within the anchor 10 until the quick-release switch 9 is engaged. With reference to FIG. 6, upon escaping from a high-altitude location and landing safely, the user may utilize the quick-release switch 9 to separate the line pin 11 from the anchor 10. Separation of the line pin 11 from the anchor 10 allows the user to separate from the canopy 13. The quick-release switch 9 is positioned adjacent to the front section 2 for easy access. Each of the plurality of chest straps 6 comprises a strap body 7 and a tongue clasp 8. The tongue clasp 8 is positioned opposite to the line pin 11 along the strap body 7 with the tongue clasp 8 removably attached to the quick-release switch 9. This allows the tongue clasp 8 to separate from the quick-release switch 9 when the quick-release switch 9 is actuated. The plurality of chest straps 6 is then separated from the quick-release switch 9 and the line pin 11 is able to separate from the anchor 10.

The present invention further comprises a chute pack envelope 23. Again referring to FIG. 3, the chute pack envelope 23 comprises a plurality of perforations 24 that allow the chute pack envelope 23 to rupture and fall away upon proper and full inflation of the canopy 13 by the chute-inflation gas generator 15. The parachute assembly 12, the chute-inflation gas generator 15, the line pin 11, and the anchor 10 are enclosed within the chute pack envelope 23 prior to deployment of the canopy 13. The canopy 13 is positioned adjacent to the plurality of perforations 24 in order to facilitate exit of the canopy 13 from the chute pack envelope 23 upon deployment of the canopy 13. The plurality of chest straps 6 traverses into the chute pack envelope 23 in order to connect to the line pin 11 within the chute pack envelope 23.

The parachute assembly 12 further comprises a plurality of lines 14. Each of the plurality of lines 14 comprises a first end 32 and a second end 33. The first end 32 of each of the plurality of lines 14 is radially and perimetrically connected to the canopy 13. The second end 33 of each of the plurality of lines 14 connects the canopy 13 to the line pin 11. This allows the line pin 11, the plurality of lines 14, and the canopy 13 to be released from the anchor 10 when the quick-release switch 9 is engaged after the user has safely landed.

The simultaneous activation dual switch 20 is utilized to deploy the canopy 13 and eject the user from the structure that he or she is escaping. The simultaneous activation dual switch 20 ensures that the canopy 13 is not accidentally deployed and comprises a first activation handle 21 and a second activation handle 22. The first activation handle 21 and the second activation handle 22 are separately tethered to a pull actuator 19 of the igniter 18. This requires both the first activation handle 21 and the second activation handle 22 to be engaged in order to deploy the canopy 13. Once the first activation handle 21 and the second activation handle 22 have been engaged, the pull actuator 19 activates the igniter 18, initiating the canopy 13 inflation process. The igniter 18 is able to ignite the propellant within the containment housing 16, creating a gas that is forcibly ejected through the output nozzle 17 in order to inflate the canopy 13. The first activation handle 21 and the second activation handle 22 are offset from each other across the front section 2 in order to allow the user to actuate the first activation handle 21 with his or her left hand and actuate the second activation handle 22 with his or her right hand. The first activation handle 21 and the second activation handle 22 are positioned adjacent to a waist opening 4 of the vest 1 in a relatively out-of-the-way position that still provides convenient access to the first activation handle 21 and the second activation handle 22 with the user's hands.

Figure 7:
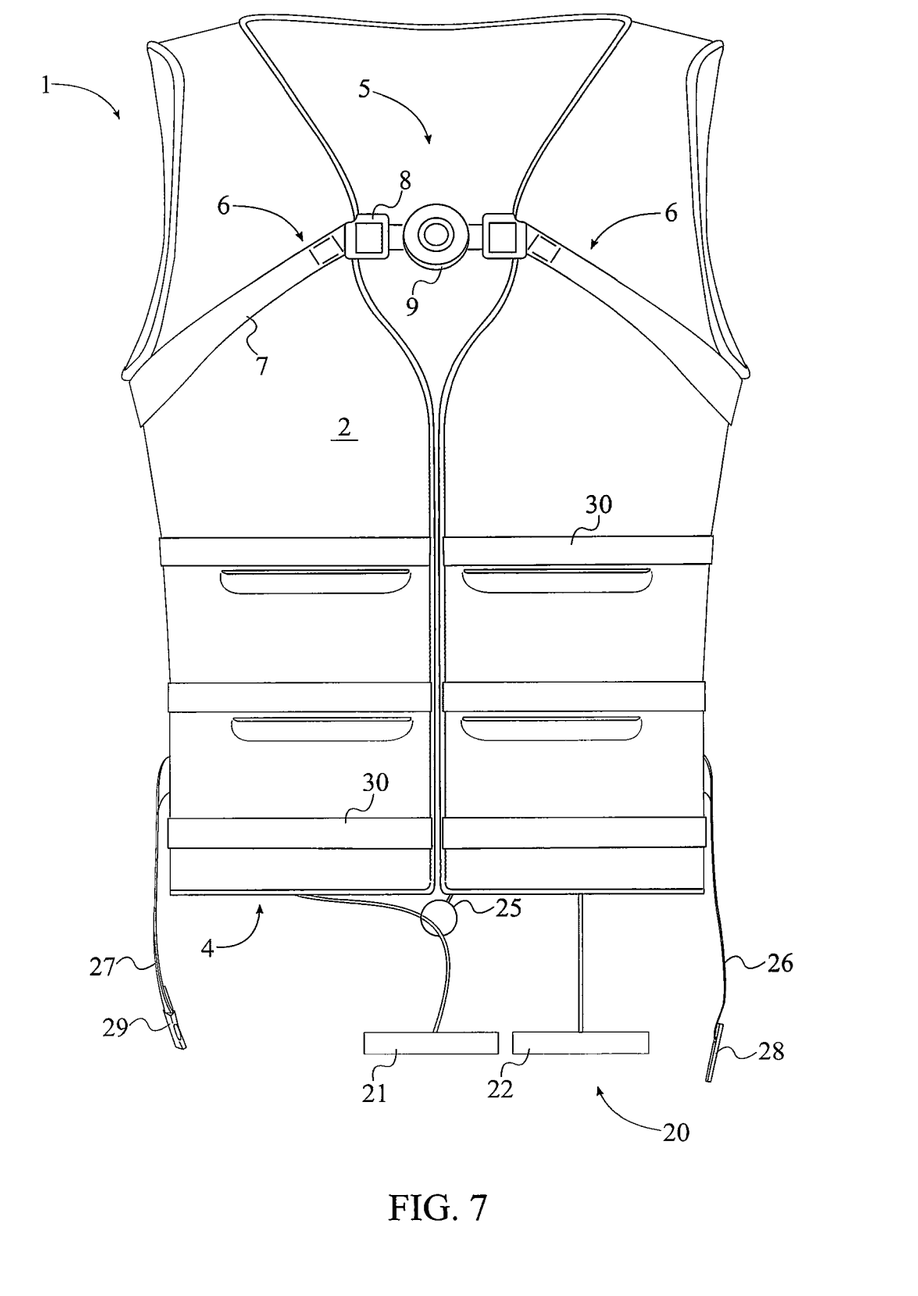
FIG. 7 is a front view of the present invention with the first activation handle threaded through the handle-positioning ring.

The present invention further comprises a handle-positioning ring 25. In the event of an emergency, it is possible for the user to become injured and unable to grasp both the first activation handle 21 and the second activation handle 22 simultaneously in order to engage the chute-inflation gas generator 15 and inflate the canopy 13. The handle-positioning ring 25 allows the user to actuate the first activation handle 21 and the second activation handle 22 simultaneously using only one hand. As such, the handle-positioning ring 25 is connected to the front section 2 in between the first activation handle 21 and the second activation handle 22. As shown in FIG. 7, this positioning allows the user to thread either the first activation handle 21 or the second activation handle 22 through the handle-positioning ring 25, placing said activation handle adjacent to the other corresponding activation handle. The user may then grasp both the first activation handle 21 and the second activation handle 22 with a single hand in order to actuate both the first activation handle 21 and the second activation handle 22 simultaneously and engage the chute-inflation gas generator 15.

Once the first activation handle 21 and the second activation handle 22 have been actuated and the canopy 13 inflation process has initiated, the large volume of gas created by igniting the propellant within the containment housing 16 is ejected through the output nozzle 17 in order to inflate the canopy 13. The gas exits the output nozzle 17 at a parachute ejection angle 31. The parachute ejection angle 31 is an acute angle between the back section 3 and the output nozzle 17. The parachute ejection angle 31 allows the present invention to eject the user backward away from the structure he or she is escaping at a slightly upward angle relative to the horizontal. The user is forcibly ejected from the structure in order to ensure that the user is able to clear the structure and to assist the user in overcoming any fears of jumping from a high altitude.

The present invention further comprises a left waist strap 26, a right waist strap 27, a clip 28, and a buckle 29. The left waist strap 26 is laterally connected adjacent to the vest 1 while the right waist strap 27 is laterally connected adjacent to the vest 1, opposite to the left waist strap 26. The clip 28 is detachably coupled to the buckle 29. The user is able to wrap the left waist strap 26 and the right waist strap 27 around the vest 1 in order to provide a more secure fit for the vest 1 to his or her body. In various example embodiments of the present invention, the left waist strap 26 or the right waist strap 27 may be adjustable.

The present invention further comprises a plurality of reflective strips 30 that is laterally connected around the vest 1. While the present invention is primarily intended for use in escaping various altitude locations such as high-rise buildings and wind turbines, the user may find him or herself in need of rescue after safely landing. The plurality of reflective strips 30 serves to increase the visibility of the user in order to increase the likelihood of being spotted by others such as rescue personnel. The plurality of reflective strips 30 is positioned parallel to each other and is interspersedly distributed along the vest 1. If the user desires, the vest 1 may continue to be worn after the line pin 11, the plurality of lines 14, and the canopy 13 have been released. The plurality of reflective strips 30 increases the user's visibility while the present invention is worn.

In various example embodiments of the present invention, the present invention may comprise at least one accessory pocket. The at least one accessory pocket is utilized to hold various accessories that may be useful to the user prior to deploying the canopy 13 or after safely landing, based on the specific application of the present invention. In one example application, a maintenance worker working on wind turbines located in a remote area may become lost in the surrounding wilderness after escaping from a wind turbine and safely landing on the ground. In this example, the at least one accessory pocket may contain items to aid rescue workers in locating the maintenance worker such as a shriek whistle, a flare, a halogen flashlight, a GPS (Global Positioning System) locator, etc.

The present invention is ideally designed to be recognizable for quick and convenient access similar to devices such as fire extinguishers, flotation devices, and other items commonly used during situations of duress. In life-saving applications for use in structures such as skyscrapers, the present invention may be stored in large numbers, possibly on racks near locations of egress for use in emergency situations. In various applications, the present invention may be utilized in conjunction with an egress station such as a platform, rail, or similar device. However, the present invention has additional applications for users in similar high-altitude situations and structures such as, but not limited to, bridge workers, window washers, and construction workers.

Although the invention has been explained in relation to its preferred embodiment, it is to be understood that many other possible modifications and variations can be made without departing from the spirit and scope of the invention as hereinafter claimed.

What is claimed is:

1. An emergency parachute comprises:
   a vest;
   a chute quick-release harness;
   a parachute assembly;
   a chute-inflation gas generator;
   a simultaneous activation dual switch;
   the vest comprises a front section and a back section;
   the parachute assembly comprises a canopy;
   the parachute assembly being mounted onto the back section;
   the chute-inflation gas generator comprises a containment housing, an output nozzle, and an igniter;
   the containment housing being integrated in between the parachute assembly and the back section;
   the output nozzle being in fluid communication with the containment housing;
   the output nozzle being oriented at a parachute ejection angle and oriented away from the back section;
   the parachute ejection angle being an angle between the back section and the output nozzle;
   the canopy being situated adjacent to the output nozzle;
   the simultaneous activation dual switch being operatively coupled to the igniter;
   the simultaneous activation dual switch being positioned on the front section;
   the igniter being integrated into the containment housing;
   a chute pack envelope;
   the chute pack envelope comprises a plurality of perforations;
   the plurality of perforations being positioned along the chute pack envelope;
   the parachute assembly, the chute-inflation gas generator, a line pin of the chute quick-release harness, and an anchor of the chute quick-release harness being enclosed within the chute pack envelope;
   the canopy being positioned adjacent to the plurality of perforations; and
   a plurality of chest straps of the chute quick-release harness traversing into the chute pack envelope.

2. The emergency parachute as claimed in claim 1 further comprises:
   the chute quick-release harness comprises the plurality of chest straps, a quick-release switch, the line pin, and the anchor;
   the plurality of chest straps being positioned about the vest;
   each of the plurality of chest straps being connected from the quick-release switch to the line pin;
   the anchor being mounted onto the back section;
   the line pin being pivotally and detachably mounted into the anchor; and
   the quick-release switch being positioned adjacent to the front section.

3. The emergency parachute as claimed in claim 2 further comprises:
   each of the plurality of chest straps comprises a strap body and a tongue clasp;
   the tongue clasp being positioned opposite to the line pin along the strap body; and
   the tongue clasp being removably attached to the quick-release switch.

4. The emergency parachute as claimed in claim 1 further comprises:
   the parachute assembly further comprises a plurality of lines;
   each of the plurality of lines comprises a first end and a second end;
   the first end of the plurality of lines being radially and perimetrically connected to the canopy; and
   the second end of the plurality of lines being connected to a line pin of the chute quick-release harness.

5. The emergency parachute as claimed in claim 1 further comprises:
   the simultaneous activation dual switch comprises a first activation handle and a second activation handle;

the first activation handle and the second activation handle being separately tethered to a pull actuator of the igniter; and the first activation handle and the second activation handle being offset from each other across the front section.

6. The emergency parachute as claimed in claim 5 further comprises:

the first activation handle and the second activation handle being positioned adjacent to a waist opening of the vest.

7. The emergency parachute as claimed in claim 5 further comprises:

a handle-positioning ring; and the handle-positioning ring being connected to the front section in between the first activation handle and the second activation handle.

8. The emergency parachute as claimed in claim 1 further comprises:

the parachute ejection angle being an acute angle between the back section and the output nozzle; and the output nozzle being oriented away from a waist opening of the vest.

9. The emergency parachute as claimed in claim 4 further comprises:

a left waist strap;

a right waist strap;

a clip;

a buckle;

the left waist strap being laterally connected adjacent to the vest;

the right waist strap being laterally connected adjacent to the vest, opposite to the left waist strap; and the clip being detachably coupled to the buckle.

10. The emergency parachute as claimed in claim 1 further comprises:

a plurality of reflective strips;

the plurality of reflective strips being laterally connected around the vest;

the plurality of reflective strip being positioned parallel to each other; and the plurality of reflective strips being interspersedly distributed along the vest.

11. An emergency parachute comprises:

a vest;

a chute quick-release harness;

a parachute assembly;

a chute-inflation gas generator;

a simultaneous activation dual switch;

a chute pack envelope;

the vest comprises a front section and a back section;

the parachute assembly comprises a canopy and a plurality of lines;

the parachute assembly being mounted onto the back section;

each of the plurality of lines comprises a first end and a second end;

the first end of the plurality of lines being radially and perimetrically connected to the canopy;

the second end of the plurality of lines being connected to a line pin of the chute quick-release harness;

the chute-inflation gas generator comprises a containment housing, an output nozzle, and an igniter;

the containment housing being integrated in between the parachute assembly and the back section;

the output nozzle being in fluid communication with the containment housing;

the output nozzle being oriented at a parachute ejection angle and oriented away from the back section;

the parachute ejection angle being an angle between the back section and the output nozzle;

the canopy being situated adjacent to the output nozzle;

the simultaneous activation dual switch being operatively coupled to the igniter;

the simultaneous activation dual switch being positioned on the front section;

the igniter being integrated into the containment housing;

the chute pack envelope comprises a plurality of perforations;

the plurality of perforations being positioned along the chute pack envelope;

the parachute assembly, the chute-inflation gas generator, the line pin of the chute quick-release harness, and an anchor of the chute quick-release harness being enclosed within the chute pack envelope;

the canopy being positioned adjacent to the plurality of perforations; and a plurality of chest straps of the chute quick-release harness traversing into the chute pack envelope.

12. The emergency parachute as claimed in claim 11 further comprises:

the chute quick-release harness comprises a plurality of chest straps, a quick-release switch, the line pin, and the anchor;

the plurality of chest straps being positioned about the vest;

each of the plurality of chest straps being connected from the quick-release switch to the line pin;

the anchor being mounted onto the back section;

the line pin being pivotally and detachably mounted into the anchor; and the quick-release switch being positioned adjacent to the front section.

13. The emergency parachute as claimed in claim 12 further comprises:

each of the plurality of chest straps comprises a strap body and a tongue clasp;

the tongue clasp being positioned opposite to the line pin along the strap body; and the tongue clasp being removably attached to the quick-release switch.

14. The emergency parachute as claimed in claim 11 further comprises:

the simultaneous activation dual switch comprises a first activation handle and a second activation handle;

the first activation handle and the second activation handle being separately tethered to a pull actuator of the igniter;

the first activation handle and the second activation handle being offset from each other across the front section; and the first activation handle and the second activation handle being positioned adjacent to a waist opening of the vest.

15. The emergency parachute as claimed in claim 14 further comprises:

a handle-positioning ring; and the handle-positioning ring being connected to the front section in between the first activation handle and the second activation handle.

16. The emergency parachute as claimed in claim 11 further comprises:

the parachute ejection angle being an acute angle between the back section and the output nozzle; and the output nozzle being oriented away from a waist opening of the vest.

17. The emergency parachute as claimed in claim 11 further comprises:
a left waist strap;
a right waist strap;
a clip;
a buckle;
the left waist strap being laterally connected adjacent to the vest;
the right waist strap being laterally connected adjacent to the vest, opposite to the left waist strap; and
the clip being detachably coupled to the buckle.

18. The emergency parachute as claimed in claim 11 further comprises:
a plurality of reflective strips;
the plurality of reflective strips being laterally connected around the vest;
the plurality of reflective strip being positioned parallel to each other; and
the plurality of reflective strips being interspersedly distributed along the vest.

\* \* \* \* \*